United States Patent [19]

Munroe

[11] 4,422,606
[45] Dec. 27, 1983

[54] AUTOMATIC LEADING EDGE SLAT FOR AIRCRAFT

[76] Inventor: Ronald G. Munroe, P.O. Box 317, Georgetown, S.C. 29440

[21] Appl. No.: 277,353

[22] Filed: Jun. 25, 1981

[51] Int. Cl.³ .............................................. B64C 13/16
[52] U.S. Cl. .................................... 244/203; 244/210; 244/214
[58] Field of Search ............... 244/198, 201, 203, 210, 244/211, 213, 214

[56] References Cited

U.S. PATENT DOCUMENTS

| | | | |
|---|---|---|---|
| 1,749,021 | 3/1930 | Davis | 244/210 |
| 1,790,329 | 1/1931 | Sieglaff | 244/210 |
| 1,830,019 | 11/1931 | Davis | 244/210 |
| 1,964,418 | 6/1934 | Alfaro | 244/213 |

*Primary Examiner*—Trygve M. Blix
*Assistant Examiner*—Ivy M. Shum
*Attorney, Agent, or Firm*—Frederick A. Zoda; John J. Kane

[57] ABSTRACT

A slat assembly is mounted upon the leading edge of an aircraft wing, and responds automatically to changes in air speed or in the angle of attack of the wing, to increase lift at lower air speeds, and to reduce the stalling speed of the wing. A capability is induced in the aircraft for landing and taking off in short distances. For an aircraft of given size and power, also, there is offered an added safety factor in that the aircraft is permitted to land at slower landing speeds than have heretofore been possible. For the purpose of accomplishing these results, the automatic leading edge slat utilizes a base plate projecting from the leading edge of the aircraft wing, and supporting a slat having airfoil characteristics forwardly of the leading edge of the wing. Connecting the slat to the base plate or strip are flat springs shaped and tensioned to permit slat motion in a plurality of directions as a response to air pressures, according to their magnitude and the directions in which they impinge against the slat surfaces. The construction additionally permits manual operation such that the slats of both wings may be positioned in a drag configuration for glide path control. Or, manual operation of a selected one of the slats can offer roll control instead of through the use of conventional ailerons. The action is superior to ailerons because adverse yaw is eliminated and rudder-controlled turn coordination is no longer necessary. Also, this allows for full span flaps which lowers the stalling speed even further.

16 Claims, 9 Drawing Figures

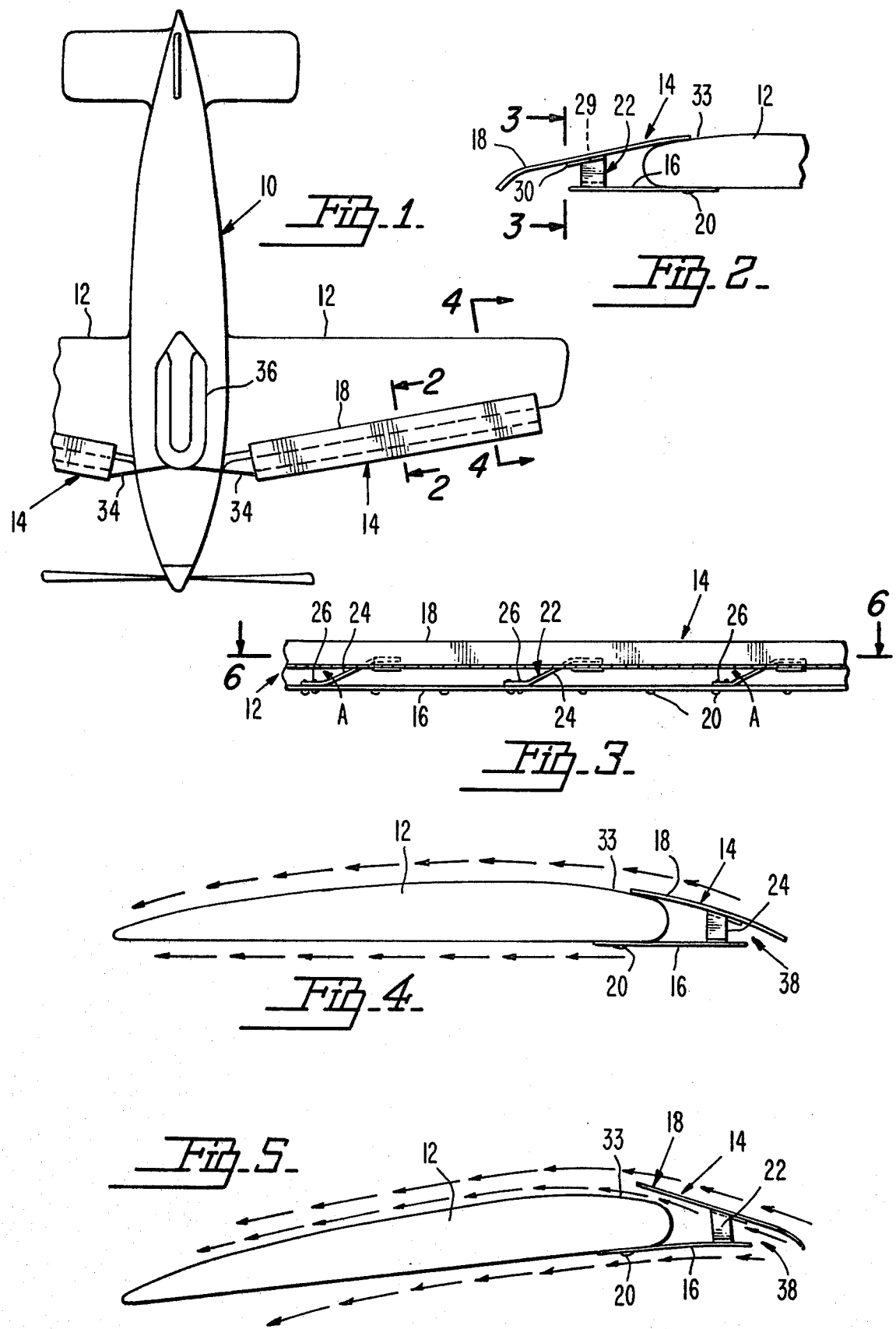

AUTOMATIC LEADING EDGE SLAT FOR AIRCRAFT

BACKGROUND OF THE INVENTION

1. Field of the Invention

The invention relates generally to the aerodynamics of heavier-than-air aircraft. In a more particular sense, the invention is in the category of leading edge slats for airplane wings.

2. Description of the Prior Art

Leading edge slats are in and of themselves well known. They are typically mounted upon the leading edge of an airplane wing with the movable fastening means internal to the wing, as for example, in STOL (short takeoff and landing) aircraft, to increase the wing area during takeoff and landing in a manner to reduce stalling speed. Hence, the leading edge slats, while having little or no effect upon the cruise speed capability of the aircraft, discharge an important function of slowing both the takeoff and landing speeds.

Heretofore, however, this feature has been incorporated in aircraft only at substantial expense. While this has not prevented installation thereof on military or commercial aircraft, the expense and complexity of the prior art leading edge slat structures have militated against their use on smaller, privately owned, comparatively low-cost general aviation aircraft.

SUMMARY OF THE INVENTION

Summarized briefly, the present invention comprises a simplified leading edge slat construction that is wholly external to the wing, thus being especially designed for but not necessarily limited to installation upon low-cost general aviation aircraft. The slat structure comprising the invention, to this end, incorporates a base plate fixedly secured to the underside of the aircraft wing, along the leading edge thereof. The base plate is simply designed as a one-piece, elongated relatively thin strip of material.

Overlying the base plate is a slat also formed as a single piece of elongated strip material, having a shallow transverse curvature merging smoothly, when the aircraft is at cruising speed, with the top surface of the airplane wing. In this way, the slat interferes minimally, if at all, with normal operation of the aircraft at cruising speeds. In fact, it increases lift by increasing wing area, without increasing drag.

The slat is connected to the base plate by means of a series of flat metal springs. These are of a particular shape such as to permit a variety of motions of the slat. One motion permitted by the springs is a rotation of the slat about an axis paralleling the leading edge of the aircraft wing. Another motion permitted is a bodily motion of the slat in the direction of its length, wherein it is caused to move upwardly from the base strip. This motion is achieved by securing to the slat a control cable or control rod extending from the cockpit, where it can be operated by the pilot. The rod enables rotation of the slat so that it acts as a spoiler or speed brake with increased rotation.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a top plan view of an airplane equipped with a slat assembly according to the present invention, a portion of one wing being broken away;

FIG. 2 is an enlarged transverse sectional view through the slat assembly and the leading edge portion of the aircraft wing, taken substantially on line 2—2 of FIG. 1;

FIG. 3 is a front elevational view of the slat assembly and the aircraft wing to which it is attached, portions being broken away, taken substantially on line 3—3 of FIG. 2;

FIG. 4 is a transverse sectional view in which the wing has been outlined without illustration of the internal construction thereof, taken substantially on line 4—4 of FIG. 1, the wing and slat assembly being illustrated as they appear during operation of the aircraft at normal cruise speed;

FIG. 5 is a view like FIG. 4 in which the wing is shown at a high angle of attack, causing the upper strip to flex away from the wing;

DESCRIPTION OF THE PREFERRED EMBODIMENT

Figure 6:
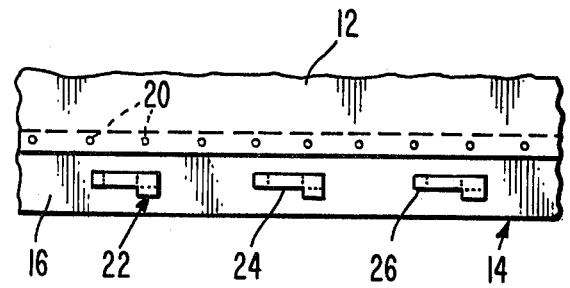
FIG. 6 is a fragmentary horizontal section taken substantially on line 6—6 of FIG. 3, the upper strip being removed.

Designated generally at 10 is an airplane of a type which is particularly well suited for installation of the present invention.

The present invention is attachable to the wings 12 of the aircraft 10 either at the time of manufacture, or alternatively, as an accessory or attachment that can be separately purchased and installed on aircraft already in use, because unlike existing slats, the entire assembly is external to the wing. In order to simplify the installation, and permit manufacture of the inventive improvement at minimal cost, the slat assembly, generally designated 12, basically comprises upper and lower strips connected by a series of flat springs which are riveted, spot welded, or resistance welded to both the upper and lower strips, with the lower strip being thereafter riveted to the underside of the airplane wing itself.

Although the leading edges of wings 12 are illustrated as being swept back, the more usual form of airplane wing would be that in which the leading edge is at right angles to the length of the fuselage. The invention is of course applicable to both types with equal facility.

The lower strip has been generally designated 16, and desirably is formed from a single piece of relatively thin but strong, light spring steel. It extends along the greatest part of the leading edge of the airplane wing, as shown in FIG. 1. It may, as shown, desirably terminate a short distance inwardly from the inner and outer ends of the wing.

Overlying and spaced upwardly from the lower strip 16 is an upper strip of airfoil 18. This is normally disposed as a forward extension of the upper surface of the airplane wing, while the base or lower strip 16 is a forward extension of the undersurface of the wing. In a preferred embodiment, the forward edge portion of the strip 18 (see FIGS. 2 and 4) projects forwardly beyond the front edge of the lower strip.

Figure 9:
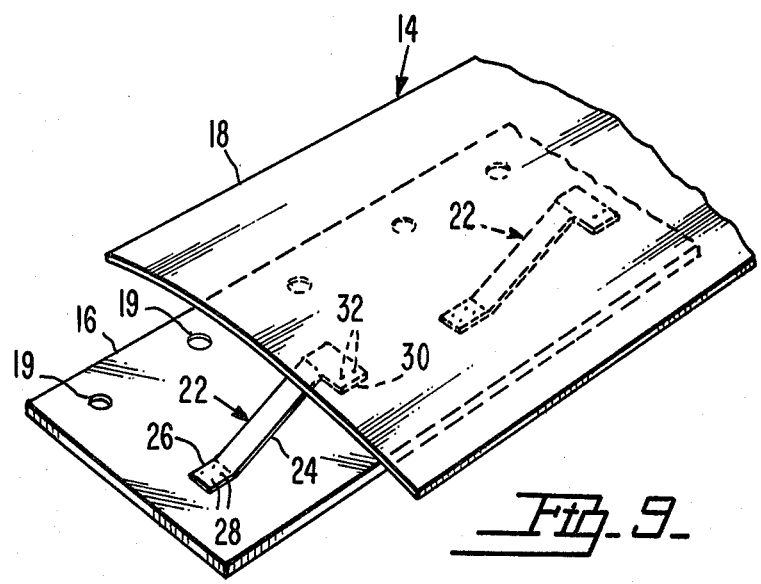
FIG. 9 is a fragmentary perspective view of the slat assembly, detached from the aircraft wing.

In accordance with the invention, the lower strip is fixedly and permanently secured to the underside of the airplane wing. To this end, formed in the rear edge portion of the lower strip 16 is a series of apertures 19 (see FIG. 9), adapted to receive rivets 20 extending into the underside of the leading edge portion of the airplane wing.

Connector elements generally designated 22, all of which are alike, are arranged in a series extending longitudinally of the respective strips, said elements being spaced uniform distances apart over the full length of the strips.

Figure 7:
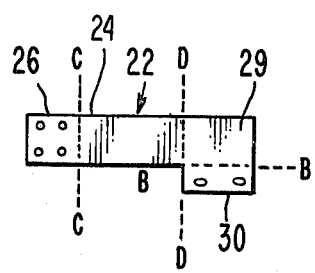
FIG. 7 is an enlarged top plan view of one of the connecting springs, per se.

Each connector element is formed as a single piece of flat spring material, including an inclined body 24 the lower end of which is integral with a horizontal extension 26 having a plurality of apertures adapted to receive rivets 28 whereby the connector element is anchored fixedly at its lower end to the lower strip 16. Body 24 of each connector element, at its other end, merges into a flat, generally rectangular extension 29 (FIG. 7) which lies in a plane parallel to that of the lower extension 26. The upper extension 29 is integrally formed with a laterally extended connecting tab 30, having openings adapted to receive rivets 32 whereby the tab is fixedly secured to the forward edge portion of the upper strip 18.

Figure 8:
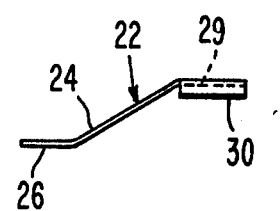
FIG. 8 is a front elevational view of one of the springs, on the same scale as FIG. 7.

Tab 30, as will be noted particularly from FIG. 8, is inclined slightly out of the plane of the upper extension 29, in a downward direction as it extends laterally outwardly from the extension 29. As a result, when the tab 30 is riveted to the strip 18, the strip 18 assumes a transversely inclined position as shown in FIG. 2, wherein it is inclined out of the plane of the upper extension 29, to the same extent as is the connecting tab 30 to which it is fixedly secured.

On the other hand, the lower strip 16 lies in a plane parallel to the plane of the lower extensions 26 (see FIG. 3).

The transverse inclination of the upper strip 18 brings it, normally, into general parallelism with the forwardly declining leading edge surface 33 of the airplane wing 12.

By reason of this arrangement, the rear edge portion of the upper strip 18 overlies the leading edge portion 33 of the upper surface of the wing in contact therewith, merging smoothly into the upper surface of the airplane wing when the airplane is at cruising speed as in FIG. 4. The upper edge surface thus comprises a forward extension of the upper surface of the wing, in effect increasing the surface area of the wing.

Secured to the inner end of the upper strip 18 (see FIG. 1) is a cable or tube 34. This extends into the cockpit 36 of the airplane. Accordingly, the pilot can pull upon the cable 34 or pull on or rotate the tube (if a tube is used instead of a cable), as a result of which the entire upper strip 18 is shifted to the left in FIGS. 1 and 3 relative to the wing 12 and the lower strip 16 or is rotated as a spoiler or air brake. The flat springs 24 flex, against their inherent tension, under these circumstances, in effect swinging counter-clockwise as viewed in FIG. 3. This causes the upper strip 18 to be spaced a greater distance from the lower strip 16 as compared to its normal position shown in FIG. 3. Strip 18 is also elevated above and wholly out of contact with the upper surface of the wing. Being inclined transversely as shown in FIGS. 2 and 4, when so elevated it acts as a spoiler for glide path control, or can provide roll control. When rotated, it drastically increases drag and acts as a speed brake.

OPERATION

Under normal conditions, when the slat assembly is not subject to air pressures or to manual actuation, the strips appear in the relative positions to each other and to the airplane wing as shown in FIGS. 2 through 4. In these circumstances, the springs 24 are tensioned to bias the upper strip 18 toward the lower strip 16 to an extent such as to cause the upper strip to extend in direct contact with the forward or leading edge portion 33 of the upper surface of the wing. The strip 18 is inclined transversely as a forward extension of the forwardly declining leading edge portion 33 of said upper surface.

This is shown to particular advantage in FIG. 4, and is the attitude of the leading edge slat structure during normal, level flight of the aircraft at its cruising speed.

In these circumstances, the air passes over the lower and upper surfaces of the wing along the lines indicated by the direction arrows in FIG. 4.

In these circumstances, the slat assembly adds lift by increasing the wing area. This characteristic of the invention is important, too, during flight at relatively low air speeds. At these times, the construction illustrated is also designed to add lift.

Assume, now, that the aircraft is to be landed. At this time, the angle of attack may be as in FIG. 5. When the aircraft is put in this attitude, the angle of attack causes the space 38 defined between the leading edge portions of the lower and upper strips 16, 18 respectively, to present itself to the air directly in front of the wing. This is contrasted with the location of the space 38 when the airplane is at normal cruising speeds with the wing level (FIG. 4). At that time, the space 38 opens wholly downwardly rather than forwardly.

With space 38 now disposed to open forwardly rather than downwardly due to the inclination of the wing 12 and hence of the entire slat assembly, ram air entering the opening 38 will seek an exit. The only exit provided will be between the trailing edge portion of the upper strip 18 and the upper surface (in particular, the leading edge portion 33 thereof) of the wing. As a result, the air will cause the trailing edge portion of the strip 18 to be forced upwardly from the wing. Springs 22 yield to the superior force exerted against the underside of the strip 18 by the ram air. As a result, the connecting tabs 30 of the several springs will be resiliently, yieldably flexed into more pronounced angles of inclination to permit the strip 18 to be forced upwardly along its trailing edge portion, out of contact with the wing surface, thereby letting the ram air escape through the space between the strip 18 and the upper surface of the wing. This is a desirable feature, in that the forcible direction of the air flow over the top of the wing reduces the stalling speed and provides more lift at lower air speeds. Keeping in mind that a stall is caused by a break in the air flow over the top of the wing, the channeling of additional air through the space 38 and thereafter over the top surface of the wing has the stated effect of preventing stalling, thus to enable the aircraft to land and take off in shorter distances. The obvious added safety factor of slower landing speeds is a further benefit derived from the construction.

This is achieved automatically, and the extent to which the upper strip 18 is flexed upwardly out of contact with the wing against the restraint of the several springs, is directly proportional to the extent of the angle of attack, that is, the greater the angle of attack, the greater the amount of ram air that will be trapped between the strips and directed over the top surface of the wing. Thus, the greater the angle of attack, the more the slat assembly will add lift and counteract stalling tendencies.

Of importance, in this regard, is the fact that the connector elements 22 are disposed edgewise to the direction of the air flow. Thus, they present thin edges to the air flow and their flat portions are caused to keep the flow at right angles to the length of the leading edge of the wing. This minimizes "washout" or a tendency on the part of the air to flow outwardly along the length of the leading edges of the wings. The connecting elements in this way themselves further aid in minimizing tendencies toward stalling.

The slat assembly thus provides an automatic response in which the tension of the springs is selected to be overcome at times, under the circumstances indicated, by the magnitude and direction of the air flow, during disposition of the wing at various angles of attack.

The device is also, however, adapted to be adjustably actuated from the cockpit, through the medium of the cable or a tube 34 connected to the upper strip 18. If the pilot pulls upon both cables or tubes 34 (see FIG. 1), the springs 22 are now caused to flex along the paths indicated by arrows A in FIG 3. This causes the strips 18 of the respective slat assemblies of both wings 12 to be bodily shifted in the direction of their lengths, toward the fuselage of the aircraft. They are at the same time caused to move upwardly from the base strips 16, out of contact with the upper surface of the wings. In this way, the strips are caused to act as spoilers, for glide path control. When rotated with a tube control, they provide a large drag increase and act as a speed brake.

Under other circumstances, the pilot may desire to pull upon one cable 34 only. This would be for the purpose of roll control, wherein the upward movement of the strip 18 off the wing, while still inclined transversely, causes it to control roll by dumping lift on that wing and at the same time increasing drag. This causes the aircraft to turn in this direction, coordinated, so rudder input is not necessary.

It may be noted that the strips are so designed as to flex in two directions. When the connecting tabs 30 flex along line B—B of FIG. 7, the strip 18 is transversely tilted out of its normal position, from the FIG. 4 to the FIG. 5 position thereof, for the purposes previously described herein. At other times, when the strip is caused to flex along lines C—C and D—D of FIG. 7, in the direction of the arrows A shown in FIG. 3, the spoiler action for glide path or roll control results.

There are many other desirable aspects to the invention. For example, the construction provides for automatic flexure of the upper strip from or due to ram air at high angles of attack during approach and take-off, thus to reduce speeds and afford greater control during these critical periods.

Further, ice build-up on the leading edge of the wing can be forcibly broken up by the pilot by pulling and/or rotating the cable or tube 34 to adjust the slat assembly, especially if the top strip is of a thinness that will produce maximum flexibility.

Of importance, too, is the fact that the entire assembly can be attached to the aircraft either during manufacture or as an optional attachment at any later date, at a very low cost. The absence of complicated operating mechanisms, pivotal connections, and the like, enhance the commercial desirability of the device, especially for use on smaller, relatively inexpensive, general aviation aircraft, and more particularly, as a simple conversion for existing aircraft, capable of being sold in kit form.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A leading edge slat assembly for an aircraft wing comprising:
    (a) a lower strip attachable to said wing in a position in which the lower strip projects forwardly from the leading edge of the wing;
    (b) an upper strip overlying the lower strip in spaced relation thereto, said upper and lower strips having leading edge portions that are spaced apart forwardly of the leading edge of the aircraft wing to which the lower strip is attached, the upper strip having a trailing edge portion adapted to overlie the upper surface of the leading edge portion of the wing; and
    (c) spring elements connecting the respective strips at spaced locations along the lengths thereof, said spring elements being tensioned to normally hold the rear edge portion of the upper strip in contact with the upper surface of the wing, while being adapted to resiliently yield in the presence of ram air directed through the space between the leading edges of the strips, for biasing of the upper strip away from the wing by the ram air to allow passage of the ram air along the top surface of the wing, the spring elements constituting the sole means connecting the strips, said leading edge portions of the strips being at all times vertically spaced apart throughout their lengths by the spring elements to define a continuously open space therebetween, the strips being relatively formed and located to require that the space open downwardly in generally level attitudes of the wing to prevent ram air from entering the space, and to open forwardly when the wing is inclined, to permit said entry.

2. A leading edge slat assemby as in claim 1 wherein the connecting elements are in the form of leaf springs.

3. A leading edge slat assembly as in claim 2 wherein each of said connecting elements is fixedly secured at its opposite ends to the upper and lower strips.

4. A leading edge slat assembly as in claim 3 in which each of said connecting elements is formed with end portions secured to the respective strips, and with inclined intermediate portions.

5. A leading edge slat assembly as in claim 4 in which the intermediate portions are inclined in the direction of the lengths of the respective strips.

6. A leading edge slat assembly as in claim 1 wherein the respective strips are formed as elongated, thin lengths of material.

7. A leading edge slat assembly as in claim 6 in which the upper strip is formed with a transverse curvature to constitute the same as a forward extension of the upper surface of the wing to which the SLAT assembly is attached.

8. A leading edge slat assembly as in claim 6 wherein the lower strip has a trailing edge portion fixedly secured to the underside of the airplane wing, the upper strip being free of connections to the airplane wing and being connected to the lower strip solely by the spring elements.

9. A leading edge slat assembly as in claim 8 in which the spring elements are of leaf spring material and have thin edges presented in facing relation to the flow of air entering the space between the strips.

10. A leading edge slat assembly as in claim 9 in which each spring element is in the form of a leaf spring having end portions offset from each other in generally parallel relation by an inclined intermediate portion extending therebetween.

11. A leading edge slat assembly as in claim 1 wherein the entire assembly is disposed externally of the wing upon which it is mounted.

12. A leading edge slat assembly for an aircraft wing comprising:
  (a) a lower strip attachable to said wing in a position in which the lower strip projects forwardly from the leading edge of the wing;
  (b) an upper strip overlying the lower strip in spaced relation thereto, said upper and lower strips having leading edge portions that are spaced apart forwardly of the leading edge of the aircraft wing to which the lower strip is attached, the upper strip having a trailing edge portion adapted to overlie the upper surface of the leading edge portion of the wing; and
  (c) spring elements connecting the respective strips at spaced locations along the lengths thereof, said spring elements being tensioned to normally hold the trailing edge portion of the upper strip in contact with the upper surface of the wing, while being adapted to resiliently yield in the presence of ram air directed through the space between the leading edges of the strips, for biasing of the upper strip away from the wing by the ram air to allow passage of the ram air along the top surface of the wing, the spring elements being in the form of leaf springs, each of said spring elements being fixedly secured at its opposite ends to the upper and lower strips, each of said spring elements being formed with end portions secured to the respective strips, and with inclined intermediate portions, the intermediate portions being inclined in the direction of the lengths of the respective strips, said assembly further including means under the control of a pilot for exerting pull upon the upper strips in the direction of their lengths, whereby to steepen the angle of inclination of the intermediate portions of the respective spring elements and thus elevate the upper strip above the upper surface of the wing out of contact therewith to dispose the upper strip as a spoiler.

13. A leading edge slat assembly for an aircraft wing comprising:
  (a) a lower strip attachable to said wing in a position in which the lower strip projects forwardly from the leading edge of the wing;
  (b) an upper strip overlying the lower strip in spaced relation thereto, said upper and lower strips having leading edge portions that are spaced apart forwardly of the leading edge of the aircraft wing to which the lower strip is attached, the upper strip having a trailing edge portion adapted to overlie the upper surface of the leading edge portion of the wing; and
  (c) spring elements connecting the respective strips at spaced locations along the lengths thereof, said spring elements being tensioned to normally hold the trailing edge portion of the upper strip in contact with the upper surface of the wing, while being adapted to resiliently yield in the presence of ram air directed through the space between the leading edges of the strips, for biasing of the upper strip away from the wing by the ram air to allow passage of the ram air along the top surface of the wing, the spring elements being in the form of leaf springs, each of said spring elements being fixedly secured at its opposite ends to the upper and lower strips, each of said spring elements being formed with end portions secured to the respective strips, and with inclined intermediate portions, each spring element being tensioned to flex along lines extending both longitudinally and transversely of the strips, whereby said spring elements when flexed along the transverse lines will permit the upper strip to be shifted bodily in the direction of its length upwardly out of contact with the upper surface of the wing, and when flexed along the longitudinal lines will tilt the upper strip transversely to change the angle which it bears to the upper surface of the wing.

14. A leading edge slat assembly for an aircraft wing comprising:
  (a) a lower strip attachable to said wing in a position in which the lower strip projects forwardly from the leading edge of the wing;
  (b) an upper strip overlying the lower strip in spaced relation thereto, said upper and lower strips having leading edge portions that are spaced apart forwardly of the leading edge of the aircraft wing to which the lower strip is attached, the upper strip having a trailing edge portion adapted to overlie the upper surface of the leading edge portion of the wing; and
  (c) spring elements connecting the respective strips at spaced locations along the lengths thereof, said spring elements being tensioned to normally hold the trailing edge portion of the upper strip in contact with the upper surface of the wing, while being adapted to resiliently yield in the presence of ram air directed through the space between the leading edged of the strips, for biasing of the upper strip away from the wing by the ram air to allow passage of the ram air along the top surface of the wing, the respective strips being formed as elongated, thin lengths of material, the lower strip having a trailing edge portion fixedly secured to the underside of the airplane wing, the upper strip being free of connections to the airplane wing and being connected to the lower strip solely by the spring elements, the spring elements being of leaf spring material and having thin edges presented in facing relation to the flow of air entering the space between the strips, each spring element having end portions offset from each other in generally parallel relation by an inclined intermediate portion extending therebetween, the end portions being in face-to-face contact with the upper and lower strips, the end portion that is in contact with the upper strip having laterally extending connecting tabs secured to the upper strip in an inclined position effective to tilt the upper strip transversely thereof relative to the lower strip.

15. A leading edge slat assembly as in claim 14 in which the space between the leading edge portions of the strips is faced downwardly when the upper strip is in contact with the upper surface of the airplane wing, said space being opened forwardly to admit ram air responsive to disposition of the airplane wing at a selected angle of attack, whereby said ram air will force the trailing edge portion of the upper strip away from the wing, in direct proportion to the steepness of said angle of attack.

16. A leading edge slat assembly for an aircraft wing comprising:
   (a) a lower strip attachable to said wing in a position in which the lower strip projects forwardly from the leading edge of the wing;
   (b) an upper strip overlying the lower strip in spaced relation thereto, said upper and lower strips having leading edge portions that are spaced apart forwardly of the leading edge of the aircraft wing to which the lower strip is attached, the upper strip having a trailing edge portion adapted to overlie the upper surface of the leading edge portion of the wing; and
   (c) spring elements connecting the respective strips at spaced locations along the lengths thereof, said spring elements being tensioned to normally hold the trailing edge portion of the upper strip in contact with the upper surface of the wing, while being adapted to resiliently yield in the presence of ram air directed through the space between the leading edges of the strips, for biasing of the upper strip away from the wing by the ram air to allow passage of the ram air along the top surface of the wing, the spring elements being in the form of leaf springs, each of said spring elements being fixedly secured at its opposite ends to the upper and lower strips, each of said spring elements being formed with end portions secured to the respective strips, and with inclined intermediate portions, the intermediate portions being inclined in the direction of the lengths of the respective strips, said assembly further including means under the control of a pilot for selectively exerting pull upon the upper strips in the direction of their lengths, and for imparting rotational movement to said upper strips, whereby to provide one or a combination of the following: namely, a spoiler action for glide path control, a single wing spoiler action for roll control, and a rotational movement of the upper strip to produce increased drag in which the slat assembly becomes effective to discharge the functions of a speed brake.

* * * * *

UNITED STATES PATENT AND TRADEMARK OFFICE
CERTIFICATE OF CORRECTION

PATENT NO. : 4,422,606
DATED : December 27, 1983
INVENTOR(S) : Ronald G. Munroe

It is certified that error appears in the above-identified patent and that said Letters Patent are hereby corrected as shown below:

Column 8, Line 51, change "edged" to --edges--

Signed and Sealed this

Twenty-second Day of May 1984

[SEAL]

Attest:

GERALD J. MOSSINGHOFF

*Attesting Officer*     *Commissioner of Patents and Trademarks*